May 20, 1958

C. Q. GLASSEY 2,835,335

LOUDSPEAKER HOUSING USING AN OPEN SIDE AS A HORN MOUTH

Filed May 2, 1955

INVENTOR.
COURTNEY Q. GLASSEY.
BY
his AGENT.

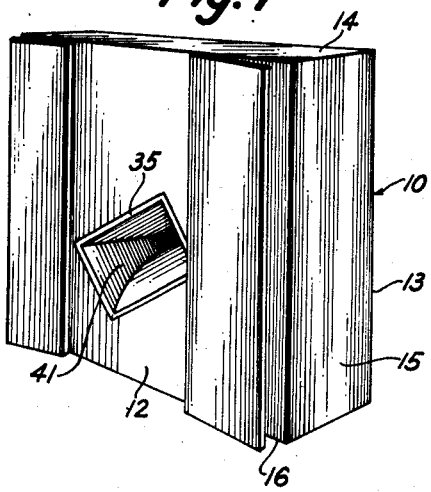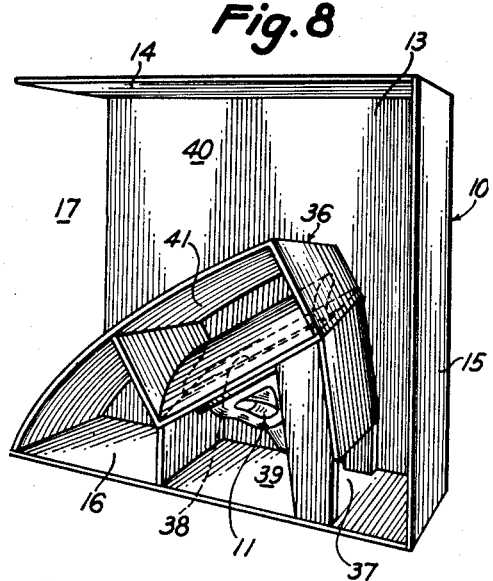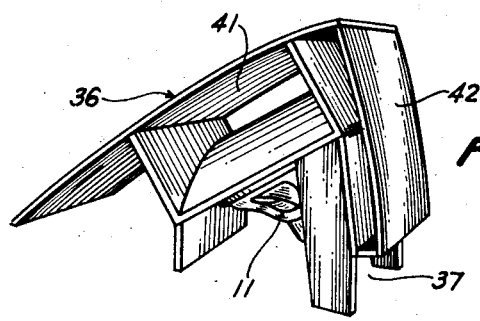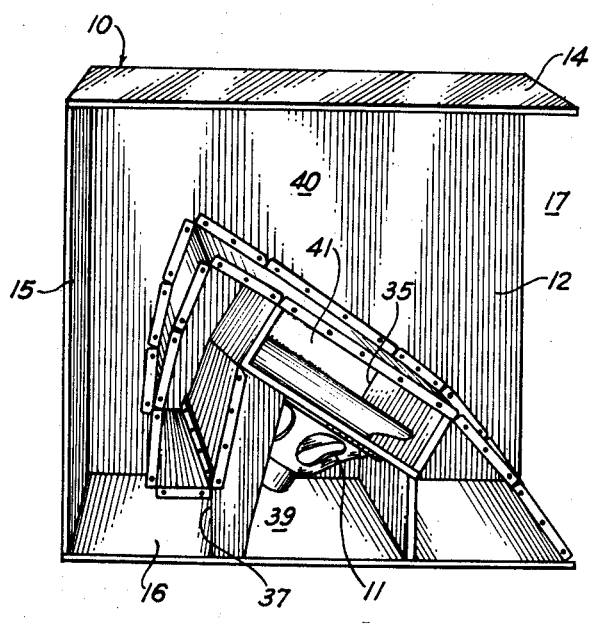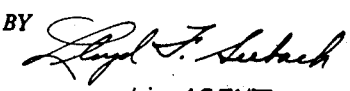

May 20, 1958  C. Q. GLASSEY  2,835,335
LOUDSPEAKER HOUSING USING AN OPEN SIDE
AS A HORN MOUTH
Filed May 2, 1955  6 Sheets-Sheet 3
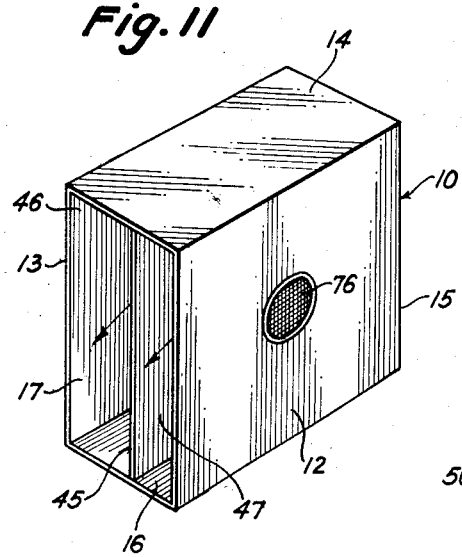
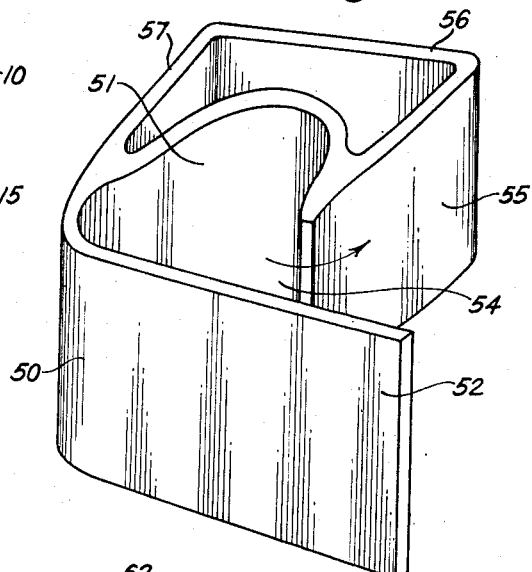
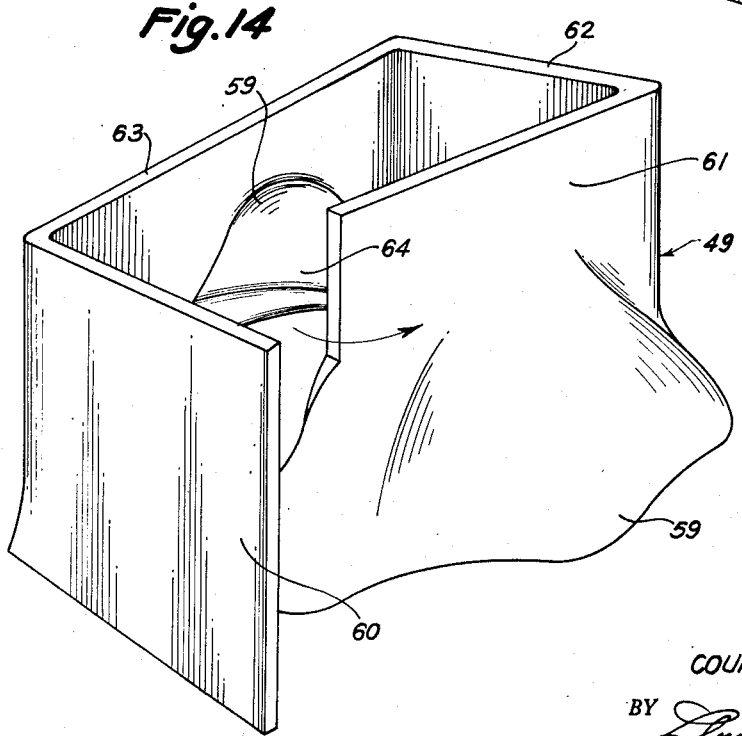
INVENTOR.
COURTNEY Q. GLASSEY.
BY Lloyd F. Seebach
his AGENT.

May 20, 1958

C. Q. GLASSEY 2,835,335

LOUDSPEAKER HOUSING USING AN OPEN SIDE
AS A HORN MOUTH

Filed May 2, 1955

INVENTOR.
COURTNEY Q. GLASSEY.

BY *Lloyd F. Siebach* his AGENT.

May 20, 1958

C. Q. GLASSEY 2,835,335

LOUDSPEAKER HOUSING USING AN OPEN SIDE AS A HORN MOUTH

Filed May 2, 1955

INVENTOR.
COURTNEY Q. GLASSEY

BY *Lloyd F. Seebach* his AGENT.

INVENTOR.
COURTNEY Q. GLASSEY.
BY
his AGENT.

United States Patent Office 2,835,335
Patented May 20, 1958

2,835,335

LOUDSPEAKER HOUSING USING AN OPEN SIDE AS A HORN MOUTH

Courtney Q. Glassey, Rochester, N. Y.

Application May 2, 1955, Serial No. 505,367

12 Claims. (Cl. 181—31)

The present invention relates to sound reproducing apparatus and more particularly to a horn structure within a housing or cabinet in which the horn is formed by a unitary structure in conjunction with the housing and substantially encircles the speaker for increasing the speaker efficiency as well as the frequency response of the speaker.

Inexpensive speaker cabinets have used cone speakers in cabinets of the open back, enclosed back, or bass reflex types. Such systems vary from poor to fair in bass response and vary from low to moderate in expense in the above order. The efficiency of the speaker in these cabinets varies from 3% to 10%.

While the advantages of the flared folded horn are known to those skilled in the art, the difficulties encountered in designing such horns have resulted in many disadvantages. All of the designs utilize complicated and expensive cabinetry to form the folded horn sections of plywood and with many of such horns there is a waste of cabinet space. Also, there is to high an acoustic capacitance which results in the loss of higher frequencies due to too many foldings, to 180° foldings where the dimensions are unfavorable, or to an oversize speaker chamber. There is also a loss of efficiency and a waste of space due to the use of an enclosed cavity housing the speaker to absorb the back wave. The design of horns known in the art is such that the cabinet bust be placed either against the wall of a room or adjacent a room corner whereby the effective mouth area will double. When such horns have been compromised by being given a larger mouth and a shorter length, the bass deficiency cannot be compensated for by the use of simple bass boost circuits.

In the present invention the above disadvantages and shortcomings of the known structures are overcome. By improving the coupling of the vibrating diaphragm of the speaker through a large mouth to the atmosphere, the horn efficiency is increased to 40% and uniformity over the whole frequency range is improved. The reduced cone travel resulting from the use of a horn reduces distortion, improves transient response, increases definition and reduces cost by permitting smaller magnet structures to be used in the speakers. For full efficiency down to the cut-off frequency, the mouth area and the horn length should be in balance and compatible with the cabinet dimensions. This can be accomplished by providing a relatively long, flared horn which has a flare in one plane and which couples a chamber within the housing and enclosing one side of the speaker diaphragm to the atmosphere. Such a horn substantially encircles the speaker and provides, in effect, a close approximation of an exponential horn which directs the lower frequencies of the speaker to an open side of the housing. This structure permits radiation to any side rather than only to the front or to a wall or walls to the rear to form a part of the horn. The back of the speaker being horn loaded gives good and extended bass. The mechanical cross-over due to capacitance of the enclosing structure and folding of the horn is in the range of 300–350 C. P. S. and is particularly effective with wide range, wide angle, multiple co-axial loud speakers. The definition due to direct radiation from a conical speaker is considered to be inferior to that of mid and high frequency horns; however, direct radiating cone speakers having adequate bass are widely accepted.

The primary object of the invention, therefore, is to provide a sound reproducing apparatus in which the lower frequencies of the speaker are directed to the atmosphere by a relatively long, flared horn which couples an opening in a chamber within the cabinet and enclosing one side of the speaker diaphragm to an open side of the cabinet and which substantially encircles the speaker.

Another object of the invention is to provide a sound reproducing apparatus in which the lower frequencies of a speaker within a cabinet are directed to an open side of the cabinet by a relatively long, flared horn substantially encircling the speaker and the higher frequencies of the speaker are radiated directly from the front of the cabinet.

Still another object of the invention is to provide a sound reproducing apparatus in which the lower frequencies of a speaker within a cabinet are directed to the atmosphere by a relatively long, flared horn which couples an opening in a chamber within the cabinet and enclosing one side of the speaker diaphragm to an open side of the cabinet and which substantially encircles the speaker, and the higher frequencies of the speaker are directed to the atmosphere by a second relatively long, flared horn which couples an opening in a second chamber within the cabinet and enclosing the other side of the speaker diaphragm to the open side of the cabinet and which substantially encircles the speaker diaphragm, the flares of the horns being in parallel planes.

Yet another object of the invention is to provide a sound reproducing apparatus in which unitary structures within a cabinet enclose both sides of the speaker diaphragm, a partition forming a common wall for the horns coupling openings in the structures to the open side of the cabinet.

A further object of the invention is to provide a sound reproducing apparatus in which separate horns are utilized for directing the higher and lower frequencies of a speaker to an open side of the cabinet housing the speaker, each of the horns being flared in only one plane and the planes of the flares being parallel to one another.

Still another object of the invention is to provide a sound reproducing apparatus in which separate horns are utilized for directing the lower frequencies of a speaker to an open side of the cabinet housing the speaker and the higher frequencies are also directed to the open side, both horns having a flare in one plane and the horns substantially encircling the speaker and being concentric thereabout.

A still further object of the invention is to provide a sound reproducing apparatus in which separate horns are utilized for directing the frequencies of a speaker within a cabinet to the atmosphere, both horns being flared in one plane, one horn directing the lower frequencies of the speaker to an open side of the cabinet, and one horn directing the higher frequencies of the speaker to an opening in a wall adjacent the open side whereby the directions of radiation are perpendicular to each other.

And another object of the invention is to provide a sound reproducing apparatus in which a unitary structure enclosing the speaker cooperates with the sides of the cabinet to provide a flare in one plane to the horn and which eliminates any complex cabinetry, thereby reducing the cost considerably.

Other advantages will be apparent to those skilled in the art by the description of the various embodiments of the invention which follow.

In each embodiment of the invention, the housing or cabinet is provided with an open side, this open side being any one of the smaller sides. Further, in each embodiment of the invention, the lower frequencies of the speaker arranged within the cabinet are always directed to the open side by a relatively long, flared horn having a flare in one plane and substantially encircling the speaker. Also, in each embodiment the inner surfaces of the sides of the housing or cabinet form one of the flared walls of the horn.

In the first embodiment, the speaker arranged within the cabinet is enclosed by a unitary structure which is provided with an opening. The opening is coupled to the open side of the cabinet by a relatively long, flared horn having a flare in one plane and which directs the lower frequencies of the speaker to the atmosphere. By utilizing the inner surfaces of the sides of the housing or cabinet and the outer surface of the structure, the flare for the horn is obtained in one plane. This embodiment directs the higher frequencies of the speaker directly to the atmosphere via an opening in one of the opposed larger sides. In this arrangement, therefore, the lower and higher frequencies of the speaker are radiated at right angles to each other.

Another embodiment of the invention in which the lower and higher frequencies of the speaker are radiated at right angles to each other utilizes a long, flared horn and a short, flared horn. The flare of the long horn is obtained by using the inner surfaces of the walls of the housing or cabinet and the outer surface of the structure enclosing the speaker. In this arrangement the short horn is also flared but in a plane perpendicular to that of the long horn and emits to the atmosphere via an opening in one of the larger and opposed sides. In both of the foregoing embodiments just briefly described, the long horn substantially encircles the speaker for directing the lower frequencies of the speaker to the open side.

In another embodiment of the invention, the cabinet is divided by a partition which also divides the open side of the housing or cabinet, the ratios of division varying from 1:1 to 1:6. A unitary structure together with one of the larger sides and the partition encloses the speaker and one side of the speaker diaphragm and is provided with an opening which permits communication between the inside of the structure and the interior of the housing or cabinet on one side of the partition. A second and similar structure together with the partition and the other large side of the housing or cabinet encloses an aperture in the partition which is aligned with the other side of the speaker diaphragm. By providing an opening in the second structure, communication is established between the interior of the second structure and the interior of the housing or cabinet on the other side of the partition. The speaker is arranged in close proximity to one of the side walls and in such a relation that the exterior surfaces of the structures and the walls of the housing or cabinet form two flared walls of the relatively long horns which couple the openings in the structures to the open side and which substantially encircle the speaker, the partition forming a wall common to both horns. The flares of the horns are determined by the structures and the walls and hence, the flares are in parallel planes. The lower and higher frequencies are, therefore, emitted from horns arranged in parallel planes.

In the other embodiment of the invention in which two horns are utilized and the higher and lower frequencies of the horn are emitted in parallel planes, a partition forms a common wall between the horns. The partition in cooperation with the unitary structure and the sides of the housing or cabinet provide the flare for the horns, the flares being in the same plane. As in the previously described embodiment the partition can vary the division of the cabinet and the open side in ratios ranging from 1:1 to 1:6.

To provide a wave front of sound normal to the horn axis diffraction plates can be provided on the structures to retard the wave front, also a sound absorbing material may be secured to the exterior surface of the structures to serve as a means of retarding or adjusting the wave front. Also, in the embodiment wherein the horns are in parallel planes an adjustable port can be provided in one of the structures to adjust the compliance of another speaker arranged in a cavity in one of the structures. The above and briefly described horn structures and arrangements will be more readily understood from the description which follows when read in conjunction with the drawings.

Reference is now made to the accompanying drawings in which like reference numerals designate like parts throughout, and wherein:

Fig. 7 is a perspective view of a cabinet disclosing another arrangement in which the higher and lower frequencies of the speaker are radiated at right angles to each other;

Fig. 8 is a perspective view of the cabinet shown in Fig. 7 and in which the front wall thereof has been removed to show the relation of the internal structure and the speaker;

Fig. 9 is a detail perspective view of the structure within the cabinet shown in Figs. 8 and 9 and showing an addition thereto for centering the structure;

Fig. 10 is a perspective view of the cabinet shown in Fig. 7 and in which the rear wall thereof has been removed to show a structure similar to that disclosed in Fig. 9 and fabricated of sheet metal;

Fig. 11 is a perspective view of a cabinet housing a speaker and in which a vertical partition divides the cabinet and the open side;

Figs. 13 and 14 are detail perspective views of the housings for enclosing the diaphragm of the speaker, as shown in Fig. 12;

Figure 1:
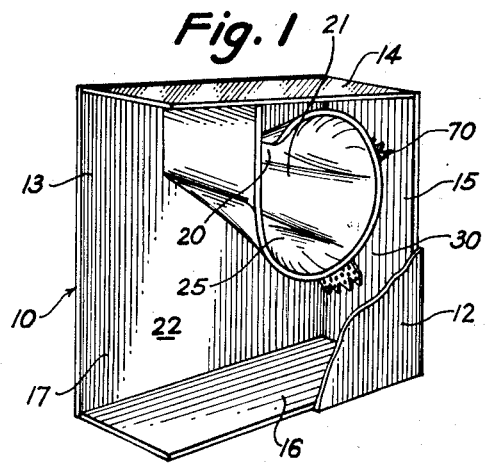
Fig. 1 is a perspective view of a cabinet in which the higher frequencies of the speaker are directly radiated and the lower frequencies are radiated from an open side, the front wall being broken away to show the structure for housing the speaker.

The embodiment of the invention disclosed in Figs. 1–4 comprises a cabinet 10 and a diaphragm-type loud speaker 11 arranged within said cabinet. Cabinet 10 is substantially rectangular and comprises the two larger and opposed sides 12 and 13, the three smaller sides 14, 15 and 16 which enclose the opposed sides, and the open side 17. The side 12 is provided with an opening or aperture 18 which is aligned with one side of the speaker diaphragm. Aperture 18 is positioned off center with respect to the center of side 12 and in close proximity to one of the three sides.

Figure 2:
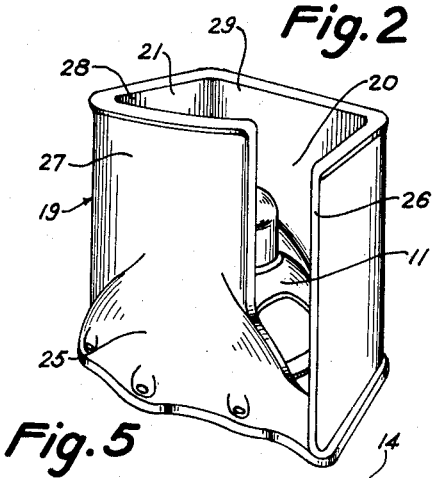
Figs. 2 and 3 are detail perspective views of the unitary structure or housing for the speaker.

With references to Fig. 2, it will be noted that speaker 11 is surrounded by a formed structure or enclosure 19 and that such structure together with the opposed sides 12 and 13 completely encloses speaker 11 and hence, the other side of the speaker diaphragm. An opening 20 provided in structure 19 permits communication between the interior 21 of the chamber formed by structure 19 and sides 12 and 13 and the interior 22 of the cabinet. Likewise, the open side 17 of cabinet 10 permits communication between the interior of the cabinet and the atmosphere. It is to be understood that the open side 17 can be any one of the other smaller walls 14, 15 or 16 so that, in effect, the open side can face to either side, the top, or the bottom and in the latter case, of course, the cabinet 10 must be mounted on legs or similar means to raise side 16 above the floor level.

From Figs. 1 and 2 it will be noted that structure 19 comprises a plurality of surfaces which are arranged as a unit and with respect to the side walls 14, 15 and 16 of cabinet 10. Structure 19 is devised with a formed or bell-shaped portion 25, which conforms to the frame of speaker 11 and is utilized for engaging and retaining the speaker in position. Opening 20 is adjacent an extension 26 of structure 19 which abuts the smaller side 14 near the open side 17. Also, sides 14, 15 and 16 and walls 27, 28 and 29 of structure 19 form, in effect, a flared horn which increases in size from opening 20 to the open side 17 and which is in a plane parallel to that of the walls 12 and 13 and therebetween. When the opposed sides 12 and 13 are positioned with respect to structure 19, a horn 30 is formed. The horn flares in one plane and increases in cross section in one dimension from the opening 20 to open side 17. Further, the horn 30 substantially encircles structure 19 and speaker 11. Horn 30, therefore, is formed by the opposed sides 12 and 13 and the exterior surfaces of structure 19 and the interior surfaces of walls 14, 15 and 16.

Since aperture 18 is aligned with one side of the speaker diaphragm, the range of frequencies which are most efficiently emitted from this side are the higher frequencies and are directly radiated to the atmosphere. Due to the enclosure of speaker 11 and as a result, enclosure of the other side of the speaker diaphragm, this side of the speaker 11 is back loaded and the range of frequencies most efficiently directed to the open side 17 by horn 30 are the lower frequencies, the higher frequencies being attenuated by the tortuous path. Accordingly, the single speaker is provided with two emitting or radiating openings, that is, aperture 18 and open side 17 and the directions of radiation are at right angles to each other.

Figure 3:
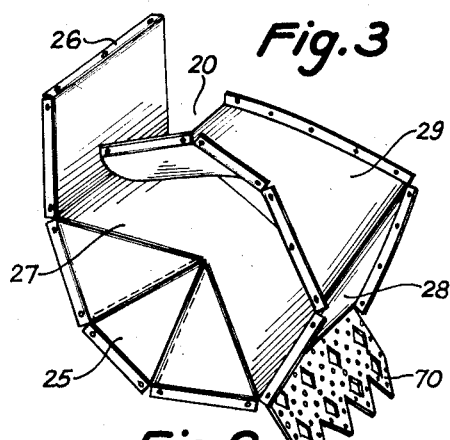

It has been found that structure 19 can be very satisfactorily cast from such materials as plastics, and concrete reinforced with fibre, or fabricated from resin-bonded glass fibre or sheet metal, as shown in Fig. 3. By providing such a unitary structure which houses the speaker, as well as forming a portion of the horn, it can be readily appreciated that cabinet 10 becomes exceedingly simple to produce and requires no expensive cabinetry. It has also been found that such a sound reproducing apparatus greatly improves the frequency response of the speaker as well as the bass efficiency thereof. Chamber 19 is designed to house the speaker and to have correct acoustical capacitance and, when mounted in a rectangular cabinet whose dimensions are in the ratio of 10:10:4 plus or minus 20% produces an approximately exponentially flared horn of adequate accuracy and whose throat and mouth areas are correct for highly efficient radiation of the lower frequencies. The minor dimensions of the cabinet can be varied to adjust the throat and mouth areas and the major dimensions can be varied to adjust the size, or length of the flared horn.

Figure 5:
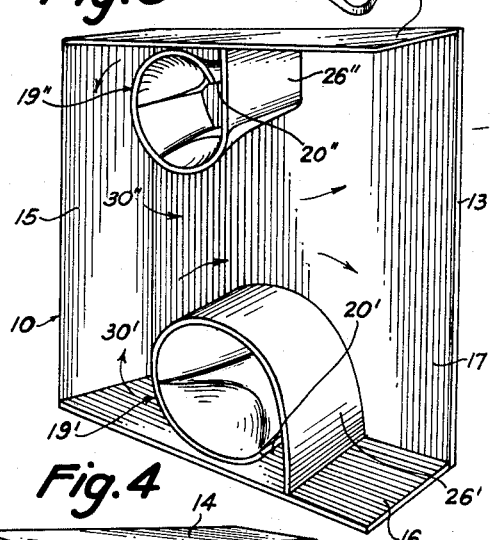
Figs. 5 and 6 are perspective views of cabinets in which more than one speaker is used and in which a single unitary structure is shown in conjunction with each speaker and a single unitary structure is utilized for both speakers.
Figure 6:
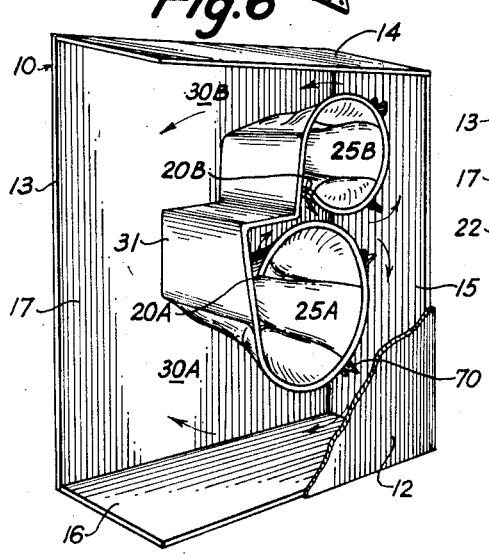
Figure 4:
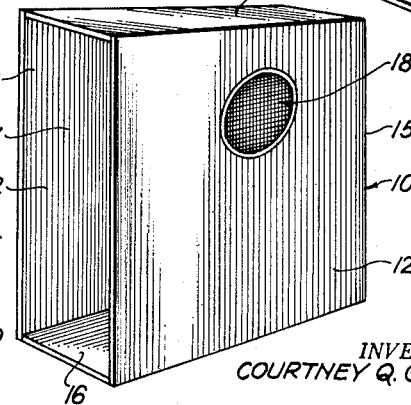
Fig. 4 is a perspective view of a cabinet embodying the arrangement of the speaker shown in Figs. 1–3.

Figs. 5 and 6 disclose another embodiment of the arrangement disclosed in Figs. 1–4 in which two speakers of different size are utilized, both radiating the higher frequencies thereof directly to the atmosphere via openings, not shown, in front wall 12. In Fig. 5 the different size speakers are mounted in structures 19' and 19'', the extensions 26' and 26'' abutting walls 14 and 16, respectively. Successive walls 15 and 16 cooperate with the exterior surfaces of structure 19' to provide a horn 30' for directing the lower frequencies of the speaker positioned in structure 19' to open side 17, whereas successive walls 14 and 15 cooperate with structure 19'' to provide horn 30'' for directing the lower frequencies of the speaker in structure 19'' to the open side. If the speakers are positioned, as shown in Fig. 6, the single structures can be combined into a single structure 31 having spaced bell or dome-shaped portions 25A and 25B for receiving the speakers. As in the previous disclosures, successive walls 15 and 16 and 15 and 14 cooperate with the exterior surfaces of structure 31 to provide horns 30A and 30B which direct the lower frequencies of the speakers from openings 20A and 20B to open side 17.

In Figs. 7–10, a second embodiment of the invention is disclosed in which speaker 11 is arranged within cabinet 10 and the opposed side 12 is provided with an aperture or opening 35. As in the previously described embodiment, a unitary structure or enclosure 36 together with opposed sides 12 and 13 encloses speaker 11. In this embodiment, structure 36 is provided with an opening 37 for one side of the speaker diaphragm and an opening 38 for the other side of the speaker diaphragm, the openings being rectangular in shape and at right angles to each other. Opening 37 in structure 36 permits communication between the chamber 39 formed by structure 36 about speaker 11 and the interior of cabinet 10, whereas opening 38 permits communication between the speaker diaphragm and opening 35 in opposed side 12. The exterior surfaces of structure 36 in cooperation with the interior surfaces of sides 14, 15 and 16 provide a flare in one plane from opening 37 to open side 17 and together with opposed sides 12 and 13 form a relatively long, flared horn 40 which increases in cross section in one dimension from opening 37 to open side 17 and substantially encircles speaker 11.

Opening 38 is coupled to aperture 35 by means of a relatively short, flared horn 41, as shown in Figs. 7–10. Horn 41 front loads speaker 11 and directs the higher frequencies of speaker 11 to aperture 35 and the atmosphere and is arranged between horn 40 and speaker 11. Structure 36 back loads speaker 11 and the lower frequencies of speaker 11 are, therefore, directed from opening 37 to open side 17. The flare of horn 40 is in a plane perpendicular to that of open side 17 and to that of the flare in one plane of horn 41. The directions of radiation of the horns are perpendicular to each other, as in the previously described embodiment. In order to permit centering of aperture 35 in the wall 12 for obtaining a more balanced appearance, structure 36 can be moved toward open end 17 and to compensate for this movement portion 42 can be added to structure 36. Fig. 10 discloses the manner in which structure 36 can be fabricated from sheet metal to form a structure the same as that disclosed in Fig. 9.

In the arrangement of the similar embodiments shown in Figs. 11–15, cabinet 10 is provided with a vertical partition 45 which divides the cabinet into two chambers 46 and 47, the partition also dividing the open side 17. The ratios of the divisions can vary from 1:1 to 1:6 depending on the cross-over frequency desired from the speaker. Partition 45 is provided with an aperture 48 which is aligned with the speaker diaphragm. Speaker 11 is mounted on partition 45 with the diaphragm thereof aligned with aperture 48 and is enclosed by structure 49. The other side of the diaphragm and, hence, the aperture 48 is also enclosed by a second structure 50. The heights of the structures are in accordance in the ratio of the division of the cabinet by partition 45 so that partition 45 serves as a common closure for one side of both structures 49 and 50 whereas side 13 closes the other side of structure 49 and side 12 closes the other side of structure 50.

As shown in Fig. 13, structure 50 has a cavity 51 which aligns with aperture 48 and an extension 52 which abuts side 14, the cavity 51 providing a relatively small chamber which couples the relatively small aperture 48 to opening 54 by means of a flare which is greater than the flare from opening 54 to open side 17 of chamber 47, thereby permitting communication between the cavity and chamber 47 of cabinet 10. As in the previously described arrangement, walls 55, 56 and 57 of structure 50 cooperate with sides 14, 15 and 16 to provide a horn 58 which couples opening 54 with open side 17, the horn substantially encircling the structure enclosing aperture 48 and extending from the opening to its respective portion of the open side 17. Since partition 45 is parallel to sides 12 and 13, horn 58 has a flare in only one plane. In other words, the cross section of horn 58 increases in only one dimension from opening 54 to open side 17.

In a like manner, structure 49 comprises a dome or bell-shaped portion 59 for retaining the speaker, an extension 60 and walls 61, 62 and 63 which form a chamber about speaker 11. This chamber is provided with an opening 64 which permits communication between the chamber and the chamber 46 of cabinet 10. Side 13 and partition 45 also serve to enclose the speaker and sides 14, 15 and 16 together with walls 61, 62 and 63 of structure 49 cooperate to form a horn 65 which couples opening 64 to its respective portion of open side 17. This horn is also flared in only one plane and in a plane parallel to that of horn 58 and, for the reason stated above with respect to partition 45, the cross section of horn 65 also increases in only one dimension from opening 64 to open side 17. Horn 65 also encircles speaker 11, as is clearly evident in Figs. 12 and 15.

Since partition 45 is common to the two chambers 46 and 47 of cabinet 10 and divides it in a ratio for the desired cross-over, it also provides and serves as a wall which is common to both horns 58 and 65. It can be readily appreciated that structure 49 and 50 can be made in various sizes to accommodate different size speakers as well as in different ratios of height in order to obtain the cross-over desired. Such a structure permits rapid assembly of the cabinet and a minimum number of parts to obtain a completed cabinet. It has also been determined that the efficiency of the speaker can be increased by the increased loading of the speaker which is accomplished with these unitary structures. Although the horn length adjacent structures 49 and 50 is much shorter than the length adjacent walls 14, 15 and 16, this can be equalized by covering the outer surfaces of the structures with a good sound insulator to retard the wave front along the shorter path. This shortening of the inner length of the horns can also be accomplished by mounting a plurality of sound diffracting plates 70 about the structures, as shown in Figs. 1, 3, 6 and 12, with each plate having uniform or increasingly larger apertures from the structure outward. The plates 70 can be tapered at the free end to provide a serrated edge together with the perforations or can be made of a plurality of narrow plates having a relatively long taper which extends from the structure into the horn. Such an arrangement provides a wave front normal to the horn axis without phase distortion.

Figure 12:
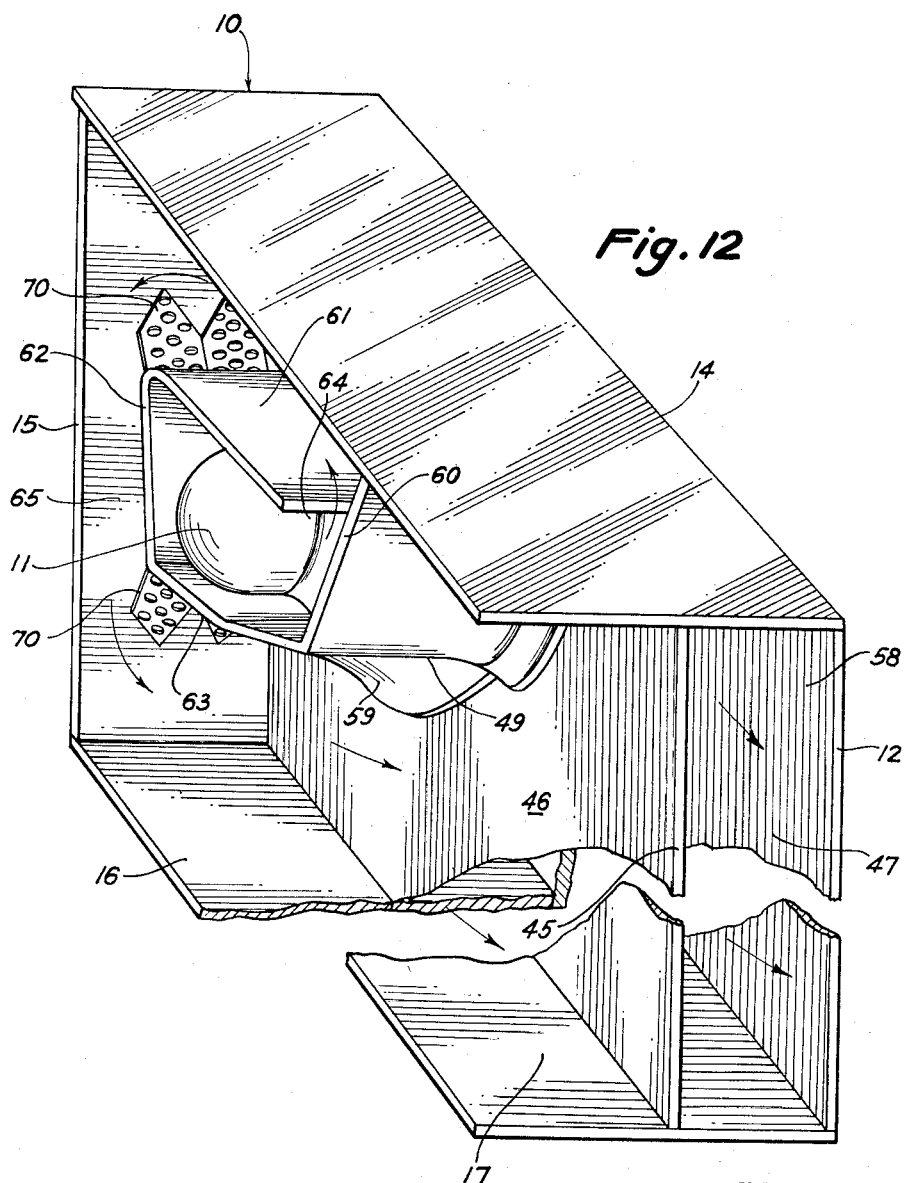
Fig. 12 is a perspective view of the arrangement of the speaker in the cabinet disclosed in Fig. 11 with portions therefor broken away and one side removed.
Figure 15:
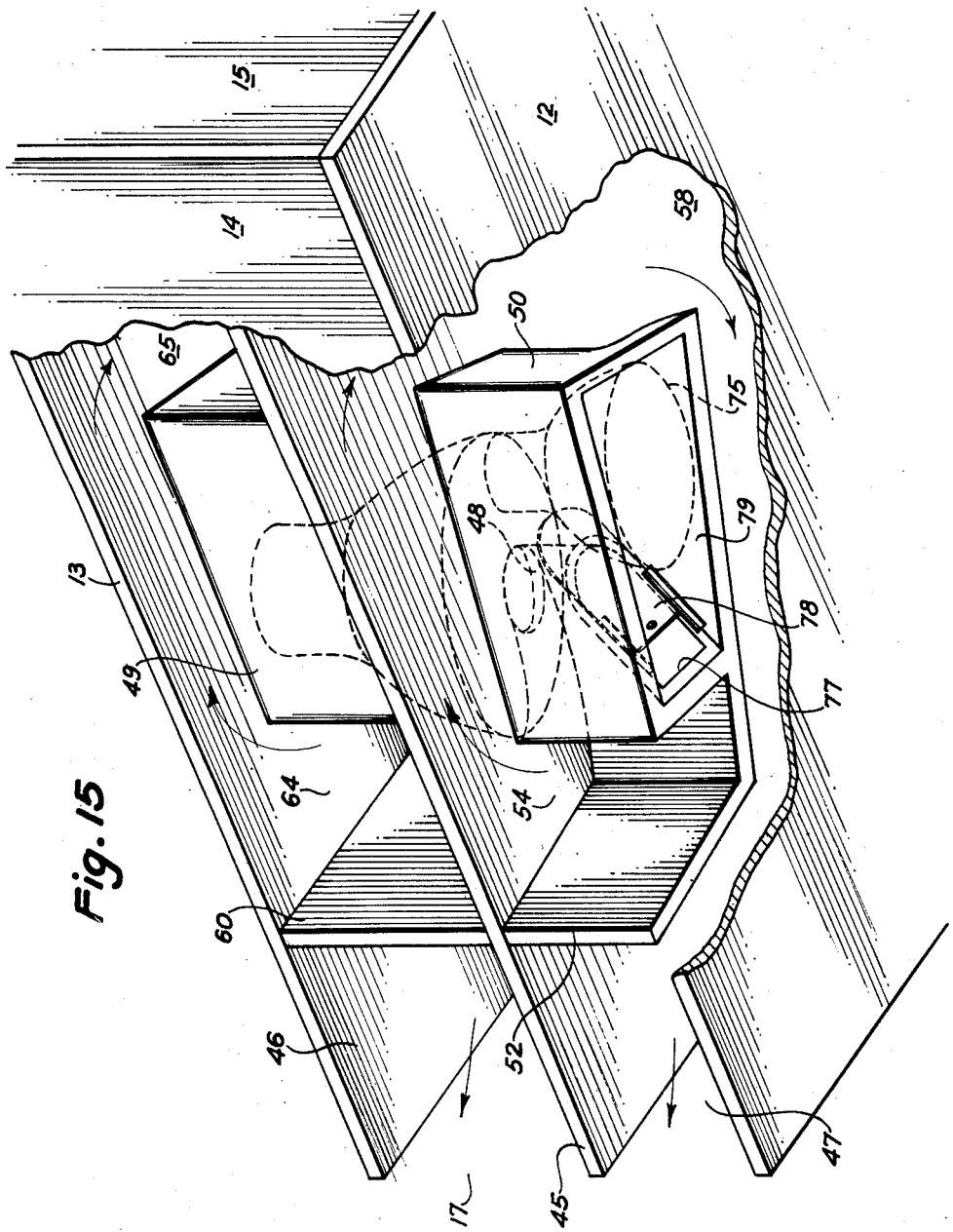
Fig. 15 is a perspective view of another embodiment similar to that shown in Fig. 12.

In Fig. 15, a variation of the disclosure in Fig. 12 is shown wherein structure 50 has been modified to accept a second or treble speaker 75 which radiates directly to the atmosphere via opening 75 shown in Fig. 11. Structure 50 in this embodiment is also provided with an aperture or port 77 which can be varied in size by the slide 78 or varied in transmission by being closed with a sound absorber of selected density, such as foam rubber, felt or Fiberglas. By these means a variable port control is provided for adjusting the compliance of the loading behind the second speaker 75, which can be a treble speaker, from a non-compliant small cavity to a compliant horn. In this arrangement of dual parallel, spiral horns, the cavity 79 for the supplementary treble speaker 75 can be in either of chambers 46 and 47. This can be accomplished by providing a partition with an opening in a structure similar to that of structure 49 and in which the speakers are reversed, thereby permitting some horn loading of the supplementary speaker to balance the frequency response at the cross-over frequency.

Figure 16:
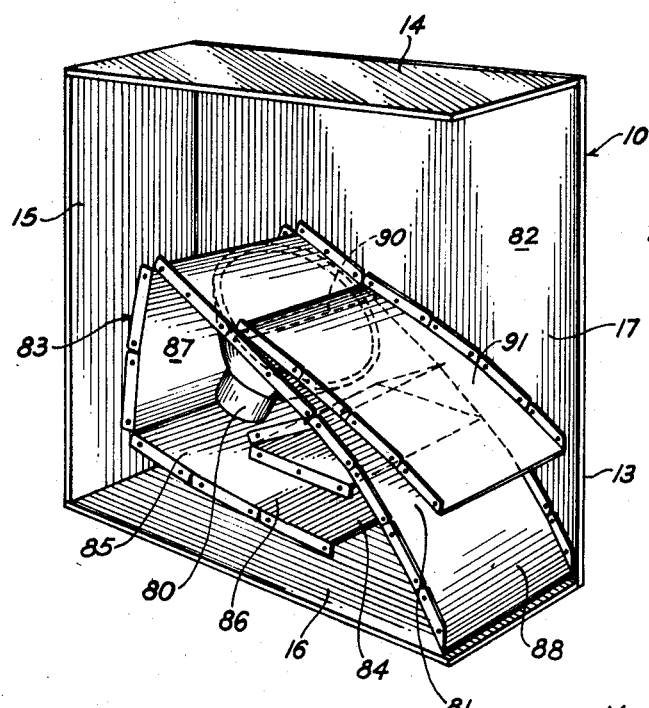
Figs. 16 and 17 are perspective views of another embodiment in which the open end is divided in a horizontal direction and the structure enclosing the speaker is fabricated of sheet metal and a formable material, respectively.
Figure 17:
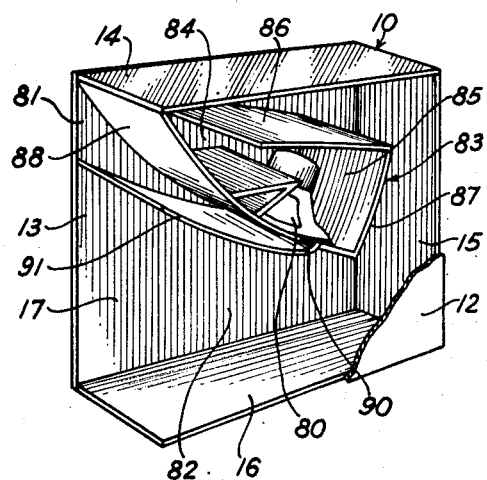
Figure 18:
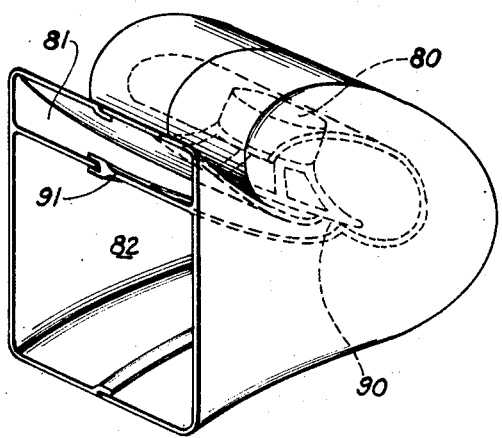
Fig. 18 is a perspective view of the embodiment shown in Figs. 16 and 17 and in which the housing is given a shape other than rectangular for a wall type of speaker.

Figs. 16–18 disclose dual concentric, spiral horns in which the higher frequencies of the speaker 80 are directed to open side 17 by horn 81 and the lower frequencies are directed to open side 17 by horn 82. The higher frequency horn is short whereas the lower frequency horn is much longer. The length of the higher frequency horn can be made longer by rotating speaker 80 away from the open side 17 and through approximately 90° or 180° depending on the length of high frequency horn desired.

As in the previous embodiments cabinet 10 comprises opposed sides 12 and 13 and the smaller sides 14, 15 and 16. End 17 is open to permit communication between the interior of cabinet 10 and the atmosphere. An opening can be provided in side 12 to permit direct radiation from a supplementary treble speaker, if desired. Speaker 80 is enclosed by a structure 83 which is arranged between sides 12 and 13 and within which speaker 80 is mounted. The structure 83 is provided with an opening 84 which permits communication of the lower frequencies from the one side of the speaker between the chamber 85 and the interior of cabinet 10, the chamber being formed about speaker 80 by walls 86, 87 and 88 and sides 12 and 13. Wall 88 is also provided with an opening 90 which permits the higher frequencies from the other side of the speaker diaphragm to enter into horn 81. Partition 91 extends from wall 88 adjacent opening 90 to the open side 17 and forms a wall common to both horns 81 and 82. Horn 82 is formed by the outer surfaces of walls 86, 87 and 88 and the interior surfaces of sides 14, 15 and 16 and has a flare in a plane perpendicular to that of open side 17. The flare increases from opening 84 to the open side 17 in one direction and is determined by the relation of structure 83 to the side walls of cabinet 10.

In each of the foregoing embodiments, the cabinet has been described as a rectangular cabinet; however, as will be readily apparent to those skilled in the art, the cabinet may be varied in shape depending on the size of the speaker and its application. For example, the dual, concentric arrangement can very well be used for public address systems, in which case, the housing or cabinet can be of a form shown in Fig. 18. Such a housing can have a bell-shaped mouth and can be molded of plastic or a similar material. Further, the cabinet for the speaker can be incorporated as part of a cabinet for a radio, television receiver or record player or a cabinet housing any combination of these sound reproducers. As stated hereinbefore, the unitary structures which enclose the speaker, whether for a single or dual horn application, can be made or formed of various materials. Also, the length of the horns can be varied depending on the position and location of the speaker within the cabinet. Although the aforementioned embodiments of the invention relate to and describe an arrangement of horns for a loud speaker, it is to be understood that additional speakers can be mounted within the cabinet, as is disclosed in Fig. 15 with respect to treble speaker 75. The additional speakers can, however, be mounted independent of the structures enclosing the speaker shown and, hence, can radiate directly to the atmosphere without altering or disturbing the results attained by the horns so formed with respect to the disclosed speaker.

Since many modifications of the invention will be apparent to those skilled in the art, the invention is not to be limited to the several disclosures but is defined by the appended claims.

Having now particularly described my invention, what I desire to secure by Letters Patent of the United States and what I claim is:

1. A sound reproducing apparatus comprising in combination, a housing having an open side for establishing communication between the interior of said housing and the atmosphere, at least one vibrating-diaphragm type loud speaker arranged within said housing, an enclosure for the speaker and having an opening for establishing communication between the rear side of the speaker diaphragm and the interior of the housing, and a horn flaring in one plane from said opening to said open side and encircling said enclosure for directing the lower frequencies of the speaker to the atmosphere, the exterior surface of said enclosure and successive walls of said housing cooperating to provide the flare of said horn in said one plane from said opening to said open side.

2. A sound reproducing apparatus comprising in combination, a housing having an open side for establishing communication between the interior of said housing and the atmosphere, at least one vibrating-diaphragm type loud speaker arranged within said housing, an enclosure for the speaker to provide a chamber thereabouts and having an opening for establishing communication between the rear side of the speaker diaphragm and the interior of said housing, and a relatively long, flared horn substantially encircling said enclosure and having a flare in one plane for directing the lower frequencies of the speaker from said opening to the atmosphere, the exterior surface of said enclosure and the inner surface of succesive walls of said housing cooperating to provide the flare of said horn in said one plane from said opening to said open side.

3. A sound reproducing apparatus comprising in combination, a rectangular cabinet having six sides, two opposed sides being larger than the four sides enclosing the opposed sides to form said cabinet and one of the four sides being open for establishing communication between the interior of the cabinet and the atmosphere, at least one vibrating-diaphragm type loud speaker arranged within said cabinet, a chamber enclosing the speaker and having an opening for establishing communication between the rear side of the speaker diaphragm and the interior of said cabinet, and a horn having a flare in one plane from the opening in the chamber to the open side for directing the lower frequencies of the speaker to the atmosphere, the exterior surface of the chamber and at least two successive sides of the cabinet cooperating to provide the flare of the horn in said one plane from the opening to the open side.

4. A sound reproducing apparatus comprising in combination, a rectangular cabinet having six sides, two opposed sides being larger than the four sides enclosing the opposed sides to form said cabinet, one of the opposed sides having an aperture therein, and one of the four sides being open for establishing communication between the interior of said cabinet and the atmosphere, at least one vibrating-diaphragm type loud speaker arranged within said cabinet, the axis of the speaker being aligned with said aperture and the diaphragm thereof being in a plane parallel to the opposed sides, a chamber enclosing the speaker and having an opening in close proximity to one of the three sides for establishing communication between the rear side of the speaker diaphragm and the interior of said cabinet, a relatively long, flared horn substantially encircling said chamber and having a flare in a plane perpendicular to the plane of the open side for directing the lower frequencies of the speaker to the atmosphere, the exterior surface of the chamber and at least two successive sides of the cabinet cooperating to provide the flare of the horn in said plane from the opening in the chamber to said open side.

5. A sound reproducing apparatus comprising in combination a housing having an open side for establishing communication between the interior of said housing and the atmosphere and an opening in a wall of said housing adjacent said open side, a vibrating-diaphragm type loud speaker arranged within said housing, one side of the speaker diaphragm communicating with said opening for emitting the higher frequencies thereof to the atmosphere through said opening, an enclosure for said speaker to form a chamber thereabouts and having an opening therein for establishing communication between the other side of the speaker diaphragm and the interior of said housing, and a relatively long, flared horn substantially encircling said enclosure for directing the lower frequencies of the speaker from the opening in said enclosure to the atmosphere, the exterior surface of said enclosure and succesive walls of said housing cooperating to provide the flare of said horn in one plane from the opening in said chamber to said open side.

6. A sound reproducing apparatus comprising in combination, a housing having an open side for establishing communication between the interior of said housing and the atmosphere and an opening in a wall of said housing adjacent said open side, a vibrating-diaphragm type loud speaker arranged within said housing and having one side thereof aligned with said opening for direct radiation of the higher frequencies of said speaker to the atmosphere, an enclosure for said speaker to form a chamber thereabouts and having an opening therein to permit communication with the interior of said housing, and a relatively long, flared horn substantially encircling said enclosure for directing the lower frequencies of the speaker from the opening in said enclosure to the atmosphere, the exterior surface of said enclosure and successive walls of said housing cooperating to provide the flare of said horn in one plane from the opening in said enclosure to said open side.

7. A sound reproducing apparatus comprising in combination, a housing having an open side for establishing communication between the interior of said housing and the atmosphere and an opening in a wall of said housing adjacent said open side, at least one vibrating-diaphragm type loud speaker arranged within said housing, an enclosure for said speaker to form a chamber thereabouts and having an opening therein for one side of the speaker diaphragm to permit communication with the interior of the housing and an aperture for the other side of said speaker diaphragm to permit communication with the opening in the wall of said housing, a relatively long, flared horn substantially encircling said enclosure for directing the lower frequencies of the speaker from the opening in said enclosure to the atmosphere, and a relatively short, folded horn for directing the higher frequencies of the speaker from the aperture in said enclosure to the opening in the wall of said housing, the direction of radiation of said horns being at right angles to each other.

8. A sound reproducing apparatus comprising in combination, a cabinet having six sides, two of the opposed sides being larger than the four sides enclosing the opposed sides to form said cabinet, one of the four sides being open and one of the opposed sides having an aperture for establishing communication between the interior of the cabinet and the atmosphere, a vibrating-diaphragm type loud speaker arranged within said cabinet and having the higher frequencies thereof emitted to the atmosphere through the aperture in said one opposed side, a chamber enclosing said speaker and having an opening therein for establishing communication between said chamber and the interior of the cabinet, and a relatively long, flared horn substantially encircling said chamber for directing the lower frequencies of the speaker from the opening in said chamber to the atmosphere, the exterior surface of the chamber and the three sides of said cabinet cooperating to provide the flare of said horn in one plane from the opening in said chamber to the open side.

9. A sound reproducing apparatus comprising in combination, a cabinet having six sides, two of the opposed sides being larger than the four sides enclosing the opposed sides to form said cabinet, one of the four sides being open and one of the opposed sides having an aperture for establishing communication between the interior of said cabinet and the atmosphere, a vibrating-diaphragm type loud speaker arranged within said cabinet, one side of the speaker diaphragm being aligned with said aperture for direct radiation of the higher frequencies of the speaker to the atmosphere, a hollow unitary structure cooperating with the opposed sides of the cabinet to provide a chamber enclosing the speaker and having an opening for establishing communication with the interior of the cabinet, and a relatively long, flared horn substantially encircling the chamber for directing the lower frequencies of the speaker from the opening in said chamber to the atmosphere, the exterior surface of the chamber and the interior surface of the three sides cooperating to provide the flare of the horn whereby the dimension of the cross section as determined thereby increases from the opening in the chamber to the open side.

10. A sound reproducing apparatus comprising in combination, a cabinet having six sides, two of the opposed sides being larger than the four sides enclosing the opposed sides to form said cabinet, one of the four sides being open and one of the opposed sides having an aperture for establishing communication between the interior of said cabinet and the atmosphere, a vibrating-diaphragm type loud speaker arranged within said cabinet, one side of the speaker diaphragm being aligned with said aperture for direct radiation of the higher frequencies of the speaker to the atmosphere, a hollow unitary structure cooperating with the opposed sides of said cabinet to provide a chamber enclosing the speaker and having an opening in close proximity to one of the three sides and the open side and in a plane perpendicular to that of said open side for establishing communication between said chamber and the interior of said cabinet, and a relatively long, flared horn substantially encircling said chamber for directing the lower frequencies of the speaker from the opening in said chamber to the atmosphere and having a flare increasing in one plane from said opening to the open side, the exterior surface of the chamber and the interior surfaces of the three sides cooperating to provide the flare of the horn in the plane perpendicular to the plane of the open side.

11. A sound reproducing apparatus comprising in combination, a rectangular cabinet having six sides, two opposed sides being larger than the four sides enclosing the opposed sides to form said cabinet, one of the four sides being open and one of the opposed sides having an aperture for establishing communication between the interior of the cabinet and the atmosphere, at least one vibrating-diaphragm type loud speaker arranged within said cabinet, a chamber enclosing one speaker and having an opening therein for one side of the speaker diaphragm to permit communication with the interior of said cabinet and a second opening for the other side of the speaker diaphragm to permit communication with the aperture in said one opposed side, a relatively long, flared horn substantially encircling said chamber for directing the lower frequencies of the speaker from the first-mentioned opening in said chamber to the open side, and a relatively short, folded horn for directing the higher frequencies of the speaker from the second opening in said chamber to the aperture in said one opposed side, the direction of radiation of said horns being at right angles to each other.

12. A sound reproducing apparatus comprising in combination, a rectangular cabinet having six sides, two opposed sides being larger than the four sides enclosing the opposed sides to form said cabinet, one of the four sides being open and one of the opposed sides having an aperture for establishing communication between the interior of the cabinet and the atmosphere, at least one vibrating-diaphragm type loud speaker arranged within said cabinet, a chamber enclosing the speaker and having an opening therein for one side of the speaker diaphragm to permit communication with the interior of said cabinet and a second opening for the other side of the speaker diaphragm and arranged at right angles to said first opening to permit communication with the aperture in the opposed side, a relatively long, flared horn substantially encircling said chamber and having a flare in one plane and increasing in cross section in said one plane from the first-mentioned opening in said chamber to the open side for directing the lower frequencies of the speaker to the atmosphere, and a relatively short, flared horn arranged between said speaker and the long horn and having a flare in one plane and increasing in cross section in the one plane from the second opening in said chamber to the aperture in said one opposed side for directing the higher frequencies of the speaker to the atmosphere, the planes of the flares of the horns and the direction of radiation of the horns being perpendicular to each other.

References Cited in the file of this patent

UNITED STATES PATENTS

| | | |
|---|---|---|
| 2,058,132 | Cirelli | Oct. 20, 1936 |
| 2,205,804 | Wells | June 25, 1940 |
| 2,224,919 | Olson | Dec. 17, 1940 |
| 2,295,483 | Knowles | Sept. 8, 1942 |

OTHER REFERENCES

Publication: "Stromberg-Carlson Custom Four Hundred," advertising pamphlet published by Stromberg-Carlson (now General Dynamics Corp.), Sound Equipment Division, Rochester, N. Y.

Cohen: publication, Radio and Television News, December 1954, pages 46 and 47.